United States Patent
Yamazoe et al.

(10) Patent No.: US 7,526,004 B2
(45) Date of Patent: Apr. 28, 2009

(54) MODE-LOCKED LASER APPARATUS

(75) Inventors: Shogo Yamazoe, Kanagawa-ken (JP); Takashi Adachi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/542,551

(22) Filed: Oct. 4, 2006

(65) Prior Publication Data
US 2009/0080474 A1  Mar. 26, 2009

(30) Foreign Application Priority Data
Oct. 4, 2005  (JP) .............................. 2005-290981

(51) Int. Cl.
*H01S 3/113* (2006.01)
*H01S 3/098* (2006.01)

(52) U.S. Cl. .............................. 372/18; 372/11; 372/19

(58) Field of Classification Search .................... 372/18, 372/19, 11, 92
See application file for complete search history.

(56) References Cited

U.S. PATENT DOCUMENTS 5,341,389 A * 8/1994 Payne et al. .................... 372/41
6,834,064 B1 * 12/2004 Paschotta et al. .............. 372/30
2005/0220154 A1 * 10/2005 Uemura et al. ................ 372/18

FOREIGN PATENT DOCUMENTS

WO  WO 0045480 A1  8/2000

OTHER PUBLICATIONS

T. Yanagitani et al., "Diode-pumped mode-locked $Yb^{3+} : Y_2 O_3$ ceramic laser", Optics Express, vol. 11, No. 22, pp. 2911-2916, 2003.
E. Innerhofer et al., "60-W average power in 810-fs pulses from a thin-disk Yb:YAG laser", Optics Letters, vol. 28, No. 5, pp. 367-369, 2003.

* cited by examiner

*Primary Examiner*—Armando Rodriguez
(74) *Attorney, Agent, or Firm*—Sughrue Mion, PLLC

(57) ABSTRACT

A mode-locked laser apparatus includes a resonator (laser cavity), a mode-locking device placed in the resonator, a solid-stated laser medium that is doped with Yb (ytterbium) and placed in the resonator and an excitation means for causing excitation light to enter the solid-state laser medium. In the mode-locked laser apparatus, light with an oscillation wavelength in a wavelength band on the longer wavelength side of the maximum peak wavelength in a fluorescence spectrum of the solid-state laser medium is used as output light.

5 Claims, 3 Drawing Sheets

MODE-LOCKED LASER APPARATUS

BACKGROUND OF THE INVENTION

1. Field of the Invention

The present invention relates to a mode-locked laser apparatus for outputting pulsed laser light by generating oscillating light from a solid-state laser medium by emission of excitation light from an excitation light source and by mode-locking.

2. Description of the Related Art

Conventionally, a mode-locking method (mode synchronization method) has been adopted as a technique for continuously generating high-speed repetitive optical pulse trains. In the mode-locking method, a solid-state laser medium placed in a resonator (resonant cavity or laser cavity) is excited (pumped) by a semiconductor laser or the like and the phases of a multiplicity of longitudinal oscillation modes are locked together. As the mode-locking method, there are an active method and a passive method. In the active method, an optical modulator is inserted into the resonator to provide loss modulation. In the passive method, a saturable absorber, of which the absorption coefficient nonlinearly changes relative to the intensity of incident light, is inserted into the resonator to passively achieve mode-locking. A mode-locked laser apparatus according to the passive method using the saturable absorber has been proposed, for example, in "Diode-pumped mode-locked $Yb^{3+}:Y_2O_3$ ceramic laser", T. Yanagitani et al., OPTICS EXPRESS, Vol. 11, No. 22, pp. 2911-2916, 2003, International Patent Publication No. WO00/45480 or the like.

When a solid-state laser medium doped with Yb (ytterbium) is used as the solid-state laser medium, light with the maximum oscillation wavelength (maximum peak wavelength in a fluorescence spectrum) of the solid-state laser medium is generally used as output light. For example, in the case of Yb:YAG (yttrium aluminum garnet), light with a wavelength of 1030 nm is used as output light (please refer to "60-W average power in 810-fs pulses from a thin-disk Yb:YAG laser", E. Innerhofer et al., OPTICS LETTERS, Vol. 28, No. 5, pp. 367-369, 2003). The maximum oscillation wavelength is a wavelength obtained in a four-level system. However, since a laser lower level is close to a ground level, the four-level system functions as a three-level system. Therefore, electrons distributed in the laser lower level reabsorb oscillating light, thereby causing reabsorption loss. Hence, there is a problem that laser oscillation efficiency sharply drops. In FIG. 3, an absorption spectrum of Yb:YAG (solid line) and a fluorescence spectrum of Yb:YAG (broken line) are illustrated (FIG. 3 is cited from "Directly Single-Diode-Pumped Continuous-Wave $Yb_3$:YAG Laser Tunable in the 1047 1051-nm Wavelength Range", Valerii V. Ter-Mikirtychev and Viktor A. Fromzel, APPLIED OPTICS, Vol. 39, Issue 27, pp. 4964-4969, 2000). As illustrated in FIG. 3, a peak A of the intensity of absorption, representing reabsorption loss of the oscillating light as described above, is present at the wavelength of 1030 nm, at which the intensity of fluorescence indicates a peak Fmax of the intensity of fluorescence. Therefore, the laser oscillation efficiency sharply drops. Hence, for the purpose of preventing such reabsorption loss, it is necessary to suppress reabsorption of the oscillating light by filling the laser upper level with electrons by high-density excitation.

When a semiconductor laser is used as excitation light, the output of a semiconductor laser that is available in the market is limited. Therefore, it is necessary to reduce a beam diameter in a solid-state laser medium to increase the density of the laser and to increase oscillation efficiency by increasing overlap between excitation light and oscillating light. The overlap between the excitation light and the oscillating light in the solid-state laser medium should be increased because if the overlap is small, the oscillation efficiency of the laser drops and there is a risk that the high-density excitation is not sufficiently achieved. Specifically, if the beam diameter of excitation light is less than that of oscillating light in the solid-state laser medium, reabsorption loss increases in a portion at which the excitation light is not present, and thereby the oscillation efficiency of the laser drops. In contrast, if the beam diameter of excitation light is greater than that of oscillating light in the solid-state laser medium, a portion at which the oscillating light is not present, in other words, a portion that does not contribute to oscillation, is excessively excited, and thereby the oscillation efficiency of the laser drops. Consequently, there is a risk that the high-density excitation is not sufficiently achieved.

Therefore, for performing high-efficiency laser oscillation, it is necessary to form a small beam waist of excitation light and a small beam waist of oscillating light in the solid-state laser medium and to increase overlap between the excitation light and the oscillating light. Therefore, a resonator is generally designed in such a manner.

However, such restrictions in design prevent reduction in the number of parts of the mode-locked laser apparatus and simplification of the structure of the mode-locked laser apparatus. If the structure of the apparatus is not simplified, there is a problem that it is impossible to reduce the cost of the apparatus.

SUMMARY OF THE INVENTION

In view of the foregoing circumstances, it is an object of the present invention to reduce restrictions in design of a mode-locked laser apparatus including an Yb-doped solid-state laser medium and to simplify the structure of the apparatus. Further, it is an object of the present invention to provide a low-cost mode-locked laser apparatus.

A mode-locked laser apparatus according to the present invention is a mode-locked laser apparatus comprising:

a resonator;

a mode-locking device placed in the resonator;

a solid-state laser medium that is doped with Yb (ytterbium), and placed in the resonator; and an excitation means for causing excitation light to enter the solid-state laser medium, wherein light with an oscillation wavelength in a wavelength band on the longer wavelength side of a maximum peak wavelength in a fluorescence spectrum of the solid-state laser medium is used as output light.

In the above structure, it is desirable that a laser lower level at the oscillation wavelength is different from a ground level by 652 $cm^{-1}$ or more.

Further, the mode-locked laser apparatus according to the present invention may be structured so that a beam waist of oscillating light is formed only on the mode-locking device in the resonator.

Further, it is desirable that the mode-locking device is a saturable absorber mirror device. Particularly, it is preferable that a semiconductor saturable absorber mirror is used as the saturable absorber mirror device.

When the solid-state laser medium is Yb:YAG, it is preferable that oscillating wave in the wavelength band on the longer wavelength side of the maximum peak wavelength is within the range of 1045 nm to 1065 nm. Further, it is preferable that the doping amount of Yb is within the range of 10at % to 100at %.

In the mode-locked laser apparatus according to the present invention, light with an oscillation wavelength in a wavelength band on the longer wavelength side of the maximum peak wavelength in a fluorescence spectrum of the solid-state laser medium is used as output light. A difference between a laser lower level and a ground level at the oscillation wavelength in the wavelength band on the longer wavelength side is large relative to a difference between a laser lower level and a ground level at the peak wavelength. Therefore, reabsorption loss at the oscillation wavelength in the wavelength band on the longer wavelength side is low relative to reabsorption loss at the peak wavelength. Hence, the mode-locked laser apparatus functions as a four-level system and oscillates at the oscillation wavelength in the wavelength band on the longer wavelength side. Unlike a case in which light with the peak wavelength is used, it is not necessary to perform high-density excitation, and thereby it is possible to ease a mode matching condition. Specifically, since it is not necessary to form small beam waists of the excitation light and the oscillating light in the solid-state laser medium, restrictions in design of the resonator, which had to be considered in the conventional technique, are reduced. Hence, it is possible to more flexibly design a resonator and to simplify the structure of the resonator.

Specifically, it is possible to simplify the structure of an optical system for condensing excitation light and to reduce the number of mirrors with light condensing functions in the resonator. Therefore, it is possible to simplify the structure of the resonator and to reduce cost by reducing the number of parts.

Especially, in a mode-locked laser apparatus including a saturable absorber mirror device as a mode-locking device, it is generally necessary to condense an oscillating light beam onto the surface of the saturable absorber mirror device. Therefore, conventionally, it was necessary to design a resonator so that beam waists of oscillating light are located at least at two positions, namely a point in the solid-state laser medium and a point on the mirror device. Hence, it was difficult to simplify the resonator. However, in the apparatus according to the present invention, it is not necessary that a beam waist is located in the solid-state laser medium. Therefore, it is possible to simplify the resonator, thereby reducing cost.

DESCRIPTION OF THE PREFERRED EMBODIMENTS

Hereinafter, embodiments of the present invention will be described.

Figure 1:
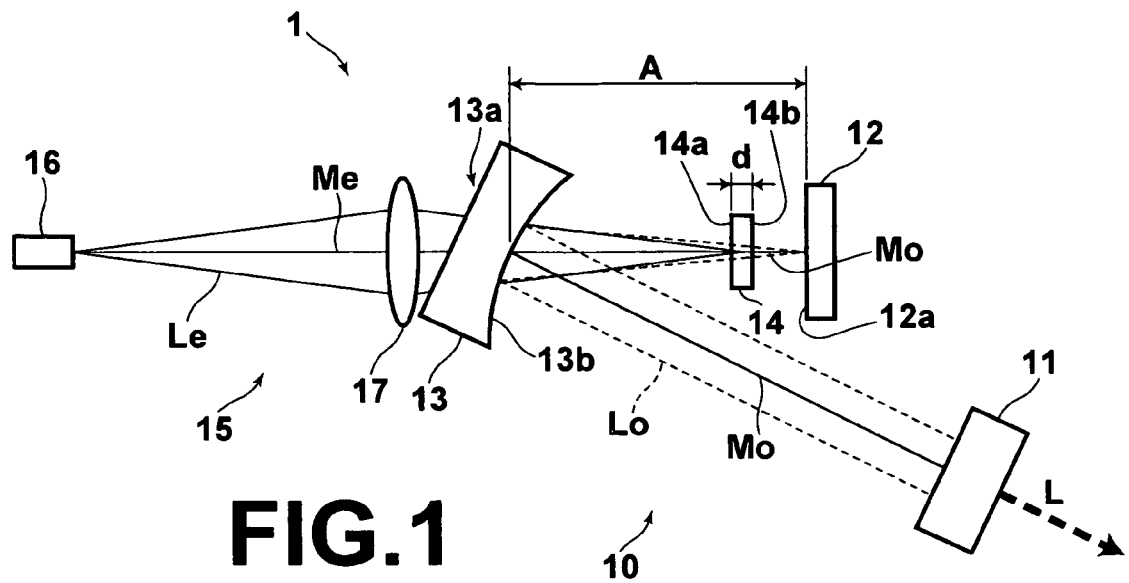
FIG. 1 is a schematic diagram illustrating the configuration of a mode-locked laser apparatus in a first embodiment of the present invention.

FIG. 1 is a schematic diagram illustrating the configuration of a mode-locked laser apparatus 1 in a first embodiment of the present invention. The mode-locked laser apparatus 1 includes an output mirror 11, a saturable absorber mirror device 12, a mirror 13, a solid-state laser medium 14 and an excitation means 15. The output mirror 11 forms an end of a resonator 10 and the saturable absorber mirror device 12 forms the other end of the resonator 10. The saturable absorber mirror device 12 is a mode-locking device. The mirror 13 has a predetermined curvature radius and guides oscillating light Lo to the output mirror 11 and the saturable absorber mirror device 12. The solid-state laser medium 14 is placed in the resonator 10. The excitation means 15 is placed in the outside of the resonator 10 and the excitation means 15 causes excitation light Le to enter the solid-state laser medium 14.

A distance A between the mirror 13 and the saturable absorber mirror device 12 is set to half of the curvature radius of the mirror 13. Further, the resonator is structured so that a beam waist of oscillating light is formed only on the saturable absorber mirror device 12.

The excitation means 15 includes a semiconductor laser 16, which is an excitation light source, and a lens 17. The semiconductor laser 16 emits excitation light Le, and the lens 17 condenses the excitation light Le emitted from the semiconductor laser 16 and causes the condensed light to enter the solid-state laser medium 14. Conventionally, it was necessary to provide a plurality of lenses in the excitation means to form a small beam waist in the solid-state laser medium to achieve high-density excitation. However, since it is not necessary to form such a small beam waist in the present invention, the excitation means may have a simple structure including a single lens. Specifically, in the conventional technique, it was necessary to form small beam waists of the excitation light and the oscillating light in the solid-state laser medium, and it was necessary that the diameters of the beam waists are approximately 25 μm. However, in the present invention, the diameter of the beam waist of the excitation light formed in the solid-state laser medium may be approximately 50 μm, which is approximately twice the diameter of the beam waist in the conventional technique. Further, in the present invention, the diameter of the oscillation beam formed in the solid-state laser medium may be approximately 100 μm, which is four times that of the conventional technique. Hence, the condition for the structure of the apparatus can be eased.

Further, an antireflection coating has been applied to both ends 14a and 14b of the solid-state laser medium 14. The antireflection coating is an antireflection coating for wavelengths within the range of ±20 nm of an oscillation wavelength λo in a wavelength band on the longer wavelength side of the maximum peak wavelength in the fluorescence spectrum of the solid-state laser medium 14 and for wavelengths within the range of ±10 nm of the peak wavelength λe of the excitation light Le.

A mirror that has a transmittance of 0.2% for wavelengths within the range of ±20 nm of the wavelength λo is used as the output mirror 11. Further, a mirror device that has an absorbance of 1% for the wavelength λo is used as the saturable absorber mirror device 12.

Further, an antireflection coating has been applied to an end 13a of the mirror 13. The end 13a of the mirror 13 is an excitation light incident surface of the mirror 13. The antireflection coating applied to the end 13a is an antireflection coating for wavelengths within the range of +10 nm of the wavelength λe of the excitation light Le. Meanwhile, an antireflection coating and a total reflection coating have been applied to the other end 13b of the mirror 13. The antireflection coating applied to the end 13b is an antireflection coating for wavelengths within the range of ±10 nm of the wavelength λe of the excitation light Le. The total reflection coating is a total reflection coating for wavelengths within the range of ±20 nm of the wavelength λo.

In the mode-locked laser apparatus 1 in the present embodiment, the solid-state laser medium 14 and a coating applied to each end of the output mirror 11 and the mirror 13 are set as described above. Accordingly, in the mode-locked laser apparatus 1 in the present embodiment, light with an oscillation wavelength λo in a wavelength band on the longer wavelength side of the maximum peak wavelength in the fluorescence spectrum of the solid-state laser medium 14 is used as output light. Conventionally, a mode-locked laser apparatus generally included three or more resonator mirrors to locate a beam waist of oscillating light in the solid-state laser medium. However, in the mode-locked laser apparatus in the present embodiment, a beam waist of oscillating light is not located in the solid-state laser medium. In the mode-locked laser apparatus in the present embodiment, the beam waist of the oscillating light is formed only on the saturable absorber mirror device 12. Further, the mode-locked laser apparatus of the present invention has a simple structure including only two mirrors, namely the output mirror 11 and the mirror 13, as resonator mirrors.

In the mode-locked laser apparatus 1 of the present embodiment, the saturable absorber mirror device 12 is positioned so that the distance A between the mirror 13 and the saturable absorber mirror device 12 becomes half of the curvature radius of the mirror 13. In other words, the saturable absorber mirror device 12 is positioned at the focus position of the convex surface mirror 13b. Therefore, oscillating light reflected toward the output mirror 11 is collimated light (parallel light). Hence, even if the output mirror 11 is moved parallel to the optical axis Mo of the resonator therealong, oscillation is possible. Further, it is possible to modulate the repetition frequency of a pulsed laser by changing the distance between the mirror 13 and the output mirror 11.

A more specific example of the structure of the mode-locked laser apparatus 1 will be described. In this example, a case in which YAG is used as a laser host medium (host material or matrix material) of the solid-state laser medium 14, and in which the solid-state laser medium 14 is an Yb:YAG solid-state laser medium that is doped with Yb at 20 at % and has a thickness d of 1 mm, will be described.

Figure 3:
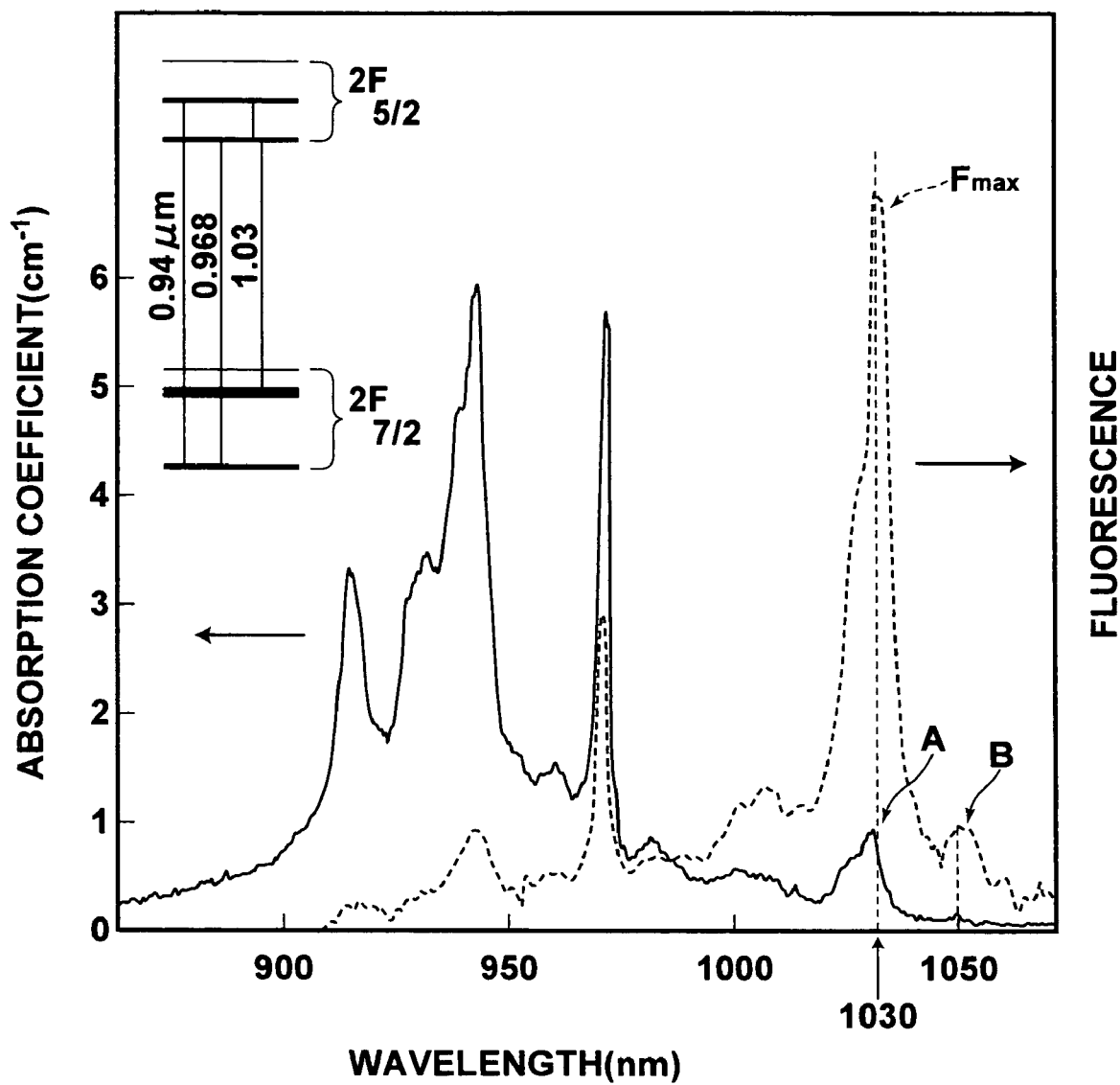
FIG. 3 is a diagram illustrating a fluorescence spectrum of Yb:YAG and an absorption spectrum of Yb:YAG.

The fluorescence spectrum of Yb:YAG and the absorption spectrum of Yb:YAG are illustrated in FIG. 3. Conventionally, a mode-locked laser apparatus for emitting output light with the maximum peak wavelength in the fluorescence spectrum, namely a mode-locked laser apparatus for emitting output light with the wavelength of 1030 nm, is well known as described above. However, in the present embodiment, the mode-locked laser apparatus is structured so that light at a wavelength of 1050 nm is used as output light. The wavelength of 1050 nm is a wavelength at a peak B in a wavelength band on the longer wavelength side of the maximum peak wavelength. By observing the absorption spectrum in FIG. 3, it is recognized that reabsorption loss is close to zero in the wavelength band on the longer wavelength side of the maximum peak wavelength 1030 nm in the fluorescence spectrum. Specifically, the reabsorption loss is close to zero at wavelengths within the range of 1045 nm to 1065 nm. This shows that if light at a wavelength within the range of 1045 nm to 1065 nm is used as output light, the Yb:YAG functions as a four-level system. Therefore, in the case of the Yb:YAG solid-state medium, if light at a wavelength within the range of 1045 nm to 1065 nm is used as output light, it is possible to ease the condition for the structure of the mode-locked laser apparatus. Further, in the wavelength band of 1045 nm through 1065 nm, it is most preferable to use light at a wavelength of 1050 nm, which is the peak B of the fluorescence spectrum in the wavelength band. Therefore, in the present embodiment, a case in which light at the wavelength of 1050 nm is used as the output light will be described.

As the semiconductor laser 16, a multimode semiconductor laser (produced by JDS Uniphase Corporation, U.S.A., SDL-6390-L3, maximum output at 6.5 W, and oscillation wavelength of 940 nm) is used. A lens 17 matches the optical axis Me of excitation light Le emitted from the semiconductor laser 16 to the optical axis Mo of the resonator and causes the excitation light Le to enter the solid-state laser medium 14 so that a beam waist of the excitation light Le is located at the center of the solid-state laser medium 14.

A mirror that has a transmittance of 0.2% for wavelengths within the range of ±20 nm of the oscillation wavelength 1050 nm is used as the output mirror 11. Further, SESAM (produced by BATOP GmbH), which has an absorbance of 1% for the oscillation wavelength 1050 nm, a modulation depth of 0.7% and saturation fluence of 30 uJ/, is used as the saturable absorber mirror device 12.

Further, a mirror 13 has an end 13a, which is an excitation light incident surface, and an end 13b, which is the other surface. An antireflection coating has been applied to the end 13a of the mirror 13, and the antireflection coating has a reflectance of 0.5% or less for wavelengths within the range of ±10 nm of the peak wavelength 940 nm of the excitation light Le. Further, an antireflection coating and a total reflection coating have been applied to the end 13b of the mirror 13. The antireflection coating applied to the end 13b has a reflectance of 0.5% or less for wavelengths within the range of ±10 nm of the wavelength 940 nm. The total reflection coating has a reflectance of 99.99% or higher for wavelengths within the range of ±20 nm of the oscillation wavelength 1050 nm. The mirror 13 reflects the oscillating light Lo toward the output mirror 11 and toward the SESAM 12, and the mirror 13 has a mirror surface 13b that has a curvature radius of 50 mm. The distance A between the mirror 13 and the SASAM 12 is set to 25 mm, which is half of the curvature radius 50 mm.

The Yb:YAG solid-state laser medium 14 is positioned on the inner side of the resonator in such a manner that the Yb:YAG solid-state laser medium 14 is apart from the SESAM 12 by 10 mm. Further, antireflection coatings have been applied to both ends 14a and 14b of the Yb:YAG solid-state laser medium 14. The antireflection coatings applied to the ends 14a and 14b of the Yb:YAG solid-state laser medium 14 have a reflectance of 0.01% or less for wavelengths within the range of ±20 nm of the oscillation wavelength 1050 nm and a reflectance of 0.5% or less for wavelengths within the range of +10 nm of the peak wavelength 940 nm of the excitation light.

As described above, the mode-locked laser apparatus 1 is structured so that light at the peak wavelength 1050 nm on the longer wavelength side of the maximum peak wavelength 1030 nm in the fluorescence spectrum of the solid-state laser medium 14 is used as the output light. Since the reabsorption loss is low at the wavelength of 1050 nm, it is possible to improve the oscillation efficiency compared with a case of using light at the wavelength of 1030 nm.

Figure 4:
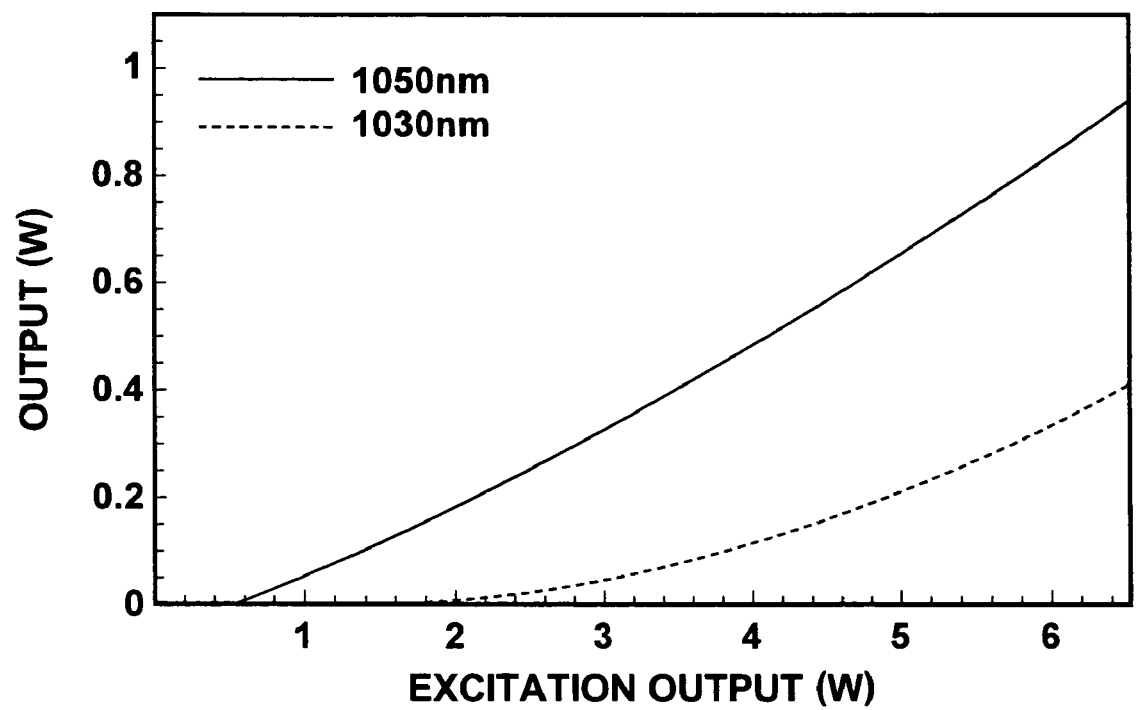
FIG. 4 is a graph showing oscillation characteristics of the mode-locked laser apparatus illustrated in FIG. 1.

FIG. 4 shows a comparison result of oscillation characteristics by theoretical calculations. In FIG. 4, an oscillation characteristic obtained when light at the peak wavelength 1030 nm is used and an oscillation characteristic obtained when light at the wavelength 1050 nm on the longer wavelength side is used are compared with each other. In the theoretical calculations, equations (A1) through (A12) described in "Modeling of Quasi-Three-Level Lasers and Operation of CwYb:YAG Lasers", T. Taura et al., APPLIED OPTICS, Vol. 36, Issue 9, Pp. 1867-1874, 1997 are used. FIG. 4 shows that when the excitation output is at the maximum value (6.5 W), oscillation at the wavelength of 1030 nm is 0.4 W and oscillation at the wavelength of 1050 nm is 0.95 W, in other words, the output at the wavelength of 1050 nm is 2.3 times the output at the wavelength of 1030 nm. Hence, it is recognized that high oscillation efficiency can be achieved in the structure of the present invention, in which neither a small beam waist of excitation light nor a small beam waist of oscillation light is formed in the solid-state laser medium.

Besides the case of using light at the wavelength of 1050 nm as the output light, if light at a wavelength within the range of 1045 nm to 1065 nm is used as the output light, it is possible to achieve high oscillation efficiency compared with oscillation efficiency achieved in the case of using light at the wavelength of 1030 nm as the output light.

In this example, Yb:YAG is used as the solid-state laser medium. Further, we could confirm that when other solid-state laser media are used, reabsorption loss can be also suppressed at wavelengths on the longer wavelength side of the maximum peak wavelength in a fluorescence spectrum, especially in an oscillation wavelength range in which a laser lower level at an oscillation wavelength is different from a ground level by 652 $cm^{-1}$ or more. Hence, efficient oscillation is possible.

Figure 2:
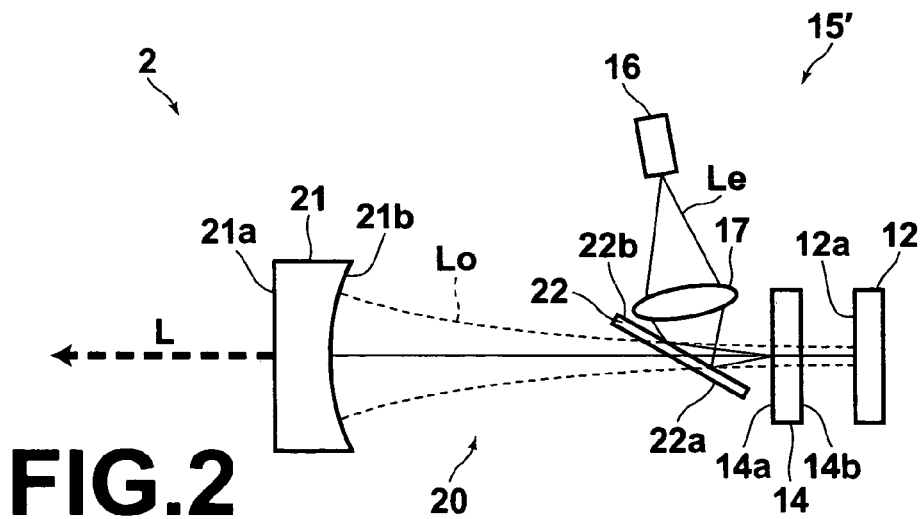
FIG. 2 is a schematic diagram illustrating the configuration of a mode-locked laser apparatus in a second embodiment of the present invention.

FIG. 2 is a schematic diagram illustrating the configuration of a mode-locked laser apparatus 2 in a second embodiment of the present invention. In FIG. 2, the same reference numerals are assigned to elements similar to those in the mode-locked laser apparatus 1 in the first embodiment of the present invention, and detailed descriptions on the similar elements are omitted. Features of the mode-locked laser apparatus 2 that are different from those of the mode-locked laser apparatus 1 will be mainly described. In the present embodiment, a mode-locked laser apparatus 2 including Yb:YAG as the solid-state laser medium 14 will be described as a specific example.

The mode-locked laser apparatus 1 in the first embodiment has a structure including a V-type resonator as the resonator 10. In contrast, the mode-locked laser apparatus 2 in the present embodiment has a structure including a linear resonator (linear-type resonator) as the resonator 20. An excitation means 15' includes a semiconductor laser 16, which is an excitation light source, a lens 17 and a dichroic mirror 22. The semiconductor laser 16 emits excitation light Le, and the lens 17 condenses the excitation light Le emitted from the semiconductor laser 16 and causes the condensed light to enter the solid-state laser medium 14. The dichroic mirror 22 sends back the excitation light Le condensed by the lens 17 toward the solid-state laser medium 14.

An antireflection coating has been applied to an end 21a of the output mirror 21. The antireflection coating has a reflectance of 0.5% or less for wavelengths within the range of ±20 nm of the oscillation wavelength 1050 nm. Further, a reflection coating have been applied to the other end 21b of the output mirror 21. The reflection coating has a transmittance of 0.2% for wavelengths within the range of +20 nm of the oscillation wavelength 1050 nm. The output mirror 21 has a predetermined curvature. Further, a distance between the output mirror 21 and the SASAM 12 is set so that a beam waist of the oscillating light Lo is located on the SESAM 12.

The substrate of the dichroic mirror 22 is made of synthetic quartz, and the dichroic mirror 22 is inclined at Brewster's angle 55.6° with respect to the optical axis of the resonator. An end 22a of the dichroic mirror 22 is non-coated. Antireflection coatings have been applied to the other end 22b of the dichroic mirror 22 for light incident at the Brewster's angle. One of the antireflection coatings has a reflectance of 0.5% or less for wavelengths within the range of +10 nm of the peak wavelength 940 nm of the excitation light Le. The other antireflection coating has a reflectance of 0.01% or less for wavelengths within a wide range of ±20 nm of the oscillation wavelength 1050 nm.

In this case, the wavelength of the output light L of the mode-locked laser apparatus 2 is also the peak wavelength 1050 nm on the longer wavelength side of the maximum peak wavelength 1030 nm in the fluorescence spectrum of the solid-state laser medium 14. Since reabsorption loss is low at the wavelength of 1050 nm, it is possible to improve the oscillation efficiency compared with the case of using light at the wavelength of 1030 nm. Further, since it is not necessary to form a beam waist of the oscillating light Lo in the solid-state laser medium, it is possible to simplify the structure of the apparatus, as achieved in the mode-locked laser apparatus 2 of the present invention.

The mode-locked laser apparatus 2 in the present embodiment has the structure of a linear resonator. Therefore, it is possible to further reduce the size of the mode-locked laser apparatus 2 compared with an apparatus having the structure of a V-type resonator, such as the mode-locked laser apparatus 1 in the first embodiment. Further, it is possible to reduce a package cost.

In each of the embodiments, a medium made of YAG doped with Yb is used as the solid-state laser medium 14. However, it is not necessary that the host material of the solid-state laser medium 14 is YAG. Regarding each of solid-state laser media made of various kinds of host materials doped with Yb, an oscillation center wavelength at which oscillation with small reabsorption loss can be achieved will be described.

When the solid-state laser medium is a solid-state laser medium using KYW as the host material, if the mode-locked laser apparatus is structured so as to use light with an oscillation center wavelength in the range of 1050 nm to 1070 nm as output light, it is possible to reduce reabsorption loss and to obtain a mode-locked laser apparatus that oscillates as a four-level system. Hence, it is possible to form the mode-locked laser apparatus that has a simple structure similar to the structure in each of the aforementioned embodiments. Further, it is possible to obtain pulsed laser of sub picosecond.

Similarly, when KGW is used as the host material, if light with an oscillation center wavelength in the range of 1050 nm to 1060 nm is used as output light, it is possible to achieve an advantageous effect similar to the advantageous effect achieved in each of the aforementioned embodiments. When $YVO_4$ is used as the host material, if light with an oscillation center wavelength in the range of 1025 nm to 1050 nm is used as output light, it is possible to achieve an advantageous effect similar to the advantageous effect achieved in each of the aforementioned embodiments. When $GdVO_4$ is used as the host material, if light with an oscillation center wavelength in the range of 1030 nm to 1060 nm is used as output light, it is possible to achieve an advantageous effect similar to the advantageous effect achieved in each of the aforementioned embodiments. When $Lu_2O_3$ is used as the host material, if light with an oscillation center wavelength in the range of 1040 nm to 1100 nm is used as output light, it is possible to achieve an advantageous effect similar to the advantageous effect achieved in each of the aforementioned embodiments. When $Sc_2O_3$ is used as the host material, if light with an oscillation center wavelength in the range of 1080 nm to 1120 nm is used as output light, it is possible to achieve an advantageous effect similar to the advantageous effect achieved in each of the aforementioned embodiments. When $Y_2O_3$ is used as the host material, if light with an oscillation center wavelength in the range of 1080 nm to 1100 nm is used as output light, it is possible to achieve an advantageous effect similar to the advantageous effect achieved in each of the aforementioned embodiments. When SYS is used as the host material, if light with an oscillation center wavelength in the range of 1070 nm to 1100 nm is used as output light, it is possible to achieve an advantageous effect similar to the advantageous effect achieved in each of the aforementioned embodiments. When BOYS is used as the host material, if light with an oscillation center wavelength in the range of 1070 nm to 1150 nm is used as output light, it is possible to achieve an advantageous effect similar to the advantageous effect achieved in each of the aforementioned embodiments. When GdCOB is used as the host material, if light with an oscillation center wavelength in the range of 1055 nm to 1120 nm is used as output light, it is possible to achieve an advantageous effect similar to the advantageous effect achieved in each of the aforementioned embodiments. When GGG is used as the host material, if light with an oscillation center wavelength in the range of 1050 nm to 1100 nm is used as output light, it is possible to achieve an advantageous effect similar to the advantageous effect achieved in each of the aforementioned embodiments.

What is claimed is:

1. A mode-locked laser apparatus comprising:
   a resonator having one end thereof formed by a saturable absorber mirror device;
   a solid-state laser medium that is doped with Yb (ytterbium) and placed in the resonator; and
   an excitation means for causing excitation light to enter the solid-state laser medium;
   wherein light with an oscillation wavelength in a wavelength band on the longer wavelength side of a maximum peak wavelength in a fluorescence spectrum of the solid-state laser medium is used as output light, and
   wherein a beam waist of oscillating light is formed only on the saturable absorber mirror device.

2. A mode-locked laser apparatus as defined in claim 1, wherein a laser lower level at the oscillation wavelength is different from a ground level by 652 $cm^{-1}$ or more.

3. A mode-locked laser apparatus comprising:
   a resonator;
   a mode-locking device placed in the resonator;
   a solid-state laser medium that is doped with Yb (ytterbium) and placed in the resonator; and
   an excitation means for causing excitation light to enter the solid-state laser medium,
   wherein light with an oscillation wavelength in a wavelength band on the longer wavelength side of a maximum peak wavelength in a fluorescence spectrum of the solid-state laser medium is used as output light,
   wherein the resonator comprises exactly two mirrors,
   wherein the solid-state laser medium is Yb:YAG, and
   wherein the oscillation wavelength in the wavelength band on the longer wavelength side of the maximum peak wavelength is within the range of 1045 nm to 1065 nm.

4. A mode-locked laser apparatus as defined in claim 2, wherein the solid-state laser medium is Yb:YAG, and wherein the oscillation wavelength in the wavelength band on the longer wavelength side of the maximum peak wavelength is within the range of 1045 nm to 1065 nm.

5. A mode-locked laser apparatus as defined in claim 1, wherein the solid-state laser medium is Yb:YAG, and wherein the oscillation wavelength in the wavelength band on the longer wavelength side of the maximum peak wavelength is within the range of 1045 nm to 1065 nm.

* * * * *